(12) United States Patent
Jung et al.

(10) Patent No.: US 7,402,037 B2
(45) Date of Patent: Jul. 22, 2008

(54) MOLD CLAMPING UNIT

(75) Inventors: Sung-wook Jung, Seoul (KR); Sung-chul Shin, Seoul (KR); Young-ju Kang, Seoul (KR); Byeong-geun Jang, Gyeonggi-do (KR); Jin-young Kim, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 156 days.

(21) Appl. No.: 11/512,373

(22) Filed: Aug. 30, 2006

(65) Prior Publication Data

US 2007/0048401 A1    Mar. 1, 2007

(30) Foreign Application Priority Data

Sep. 1, 2005    (KR) .................... 10-2005-0081147

(51) Int. Cl.
*B29C 45/64* (2006.01)

(52) U.S. Cl. .............. 425/589; 425/595; 425/450.1; 425/451.9

(58) Field of Classification Search .......... 425/589, 425/590, 595, 450.1, 451.2, 451.3, 451.9, 425/DIG. 221; 264/328.1
See application file for complete search history.

(56) References Cited

U.S. PATENT DOCUMENTS 5,868,989 A * 2/1999 Glaesener et al. ........ 264/328.1
RE37,827 E * 9/2002 Schad .................... 425/595
6,893,250 B2 * 5/2005 Meschia et al. .......... 425/595
6,945,765 B2 * 9/2005 Roetzel ................... 425/171

FOREIGN PATENT DOCUMENTS

| JP | 05301264 A | * | 11/1993 |
| JP | 05345340 A | * | 12/1993 |
| JP | 06064011 A | * | 3/1994 |

* cited by examiner

*Primary Examiner*—Philip C Tucker
*Assistant Examiner*—Dimple N Bodawala
(74) *Attorney, Agent, or Firm*—McDermott Will & Emery LLP (57) ABSTRACT

The mold clamping unit comprises a column mounted in a transfer means and moving in forward and backward direction; a mold clamping piston in which clamping operation and clamping-releasing operation are performed; plurality of column teeth disposed on a surface of the column along an axial direction of the column; center bore provided in a central of the mold clamping piston; clamping tooth seating groove with a plurality of clamping teeth inside the mold clamping piston contacting the center bore; rotating plate with plurality of clamping tooth guide grooves separated from the clamping teeth in the axial direction of the column; and a teeth rod positioned in each of the clamping tooth guide groove, wherein each teeth rod is connected to each clamping teeth during the rotation of the rotating plate, for moving each clamping tooth in a central or radial direction of the rotating plate and clamping of the clamping tooth and the column can proceed.

15 Claims, 11 Drawing Sheets

MOLD CLAMPING UNIT

CROSS-REFERENCE TO RELATED APPLICATIONS

This application claims the benefit of Korean Patent Application No. 10-2005-81147, filed on Sep. 1, 2005, in the Korean Intellectual Property Office, the disclosure of which incorporated herein in its entirety by reference.

BACKGROUND OF THE INVENTION

1. Field of the Invention

The present invention relates to a mold clamping unit, and more specially, to a mold clamping unit in which the amount of an operating oil required in mold clamping operations is minimized, processing facility and space efficiency are maximized when manufacture and stable mold opening and closing operations are guaranteed.

2. Description of the Related Art

Injection molding apparatuses largely include an injection unit and a mold clamping unit. The mold clamping unit basically controls an operation of opening and closing a mold, that is, a mold opening operation and a mold closing operation. A melting material is injected into the mold from the injection unit when the mold closing operations of the mold clamping unit are completed. In this case, the melting material with a high pressure is generally injected into the mold. Thus, the mold should be strongly clamped so that the mold cannot be opened by the high-pressure melting material.

One of the most conventional mold clamping units are a direct pressure type clamping means. However, the clamping means is not suitable for a high-speed and accurate operation.

SUMMARY OF THE INVENTION

The present invention provides a mold clamping unit in which the amount of an operating oil required in mold clamping operations is minimized, processing facility and space efficiency are maximized when manufacture and stable mold opening and closing operations are guaranteed.

According to an aspect of the present invention, there is provided a mold clamping unit, the mold clamping unit comprising: a column mounted in a transfer means and moving in forward and backward directions; a mold clamping piston in which a locking/unlocking operation with the column are performed; a plurality of column teeth disposed on a surface of the column along an axial direction of the column, a space between the column teeth being defined as a column groove by the column teeth; a center bore provided in a central portion of the mold clamping piston so that the column can penetrate through the center bore when the column moves in forward and backward directions; a clamping tooth seating groove provided inside the mold clamping piston contacting the center bore in a ring shape along a circumference of the center bore; a plurality of clamping teeth seated in the clamping tooth seating groove in a circumferential direction; a rotating plate separated from the clamping teeth in the axial direction of the column; a plurality of clamping tooth guide grooves having a predetermined length provided on the rotating plate toward a center from an outer wall of the rotating plate; and a teeth rod positioned in each of the clamping tooth guide groove, wherein each teeth rod is connected to each clamping teeth so that, when the rotating plate makes a rotational motion, each teeth rod can move in the clamping teeth guide groove, each clamping tooth can move in a central or radial direction of the rotating plate and engaging of the clamping tooth with the column can proceed.

Each clamping tooth guide groove may include a groove starting point and a groove ending point and the groove ending point may be relatively close to a center of the rotating plate compared to the groove starting point.

Each clamping tooth guide groove may have a predetermined curvature.

The clamping tooth may include at least one clamping tooth protrusion in the axial direction of the column.

A width of the column tooth groove and a width of the clamping tooth protrusion may correspond to a size of the column tooth of the column and a width of the column groove, respectively.

A hydraulic piston may be provided at one side of the rotating plate to rotate the rotating plate.

A fine gear may be formed in the rotating plate, a pinion may be provided at one side of the rotation plate to be engaged with the fine gear and a driving motor for transmitting a driving force to the pinion may be provided so that the rotation plate can be rotated by driving the driving motor.

According to features of the present invention, a plurality of clamping teeth are engaged with a column in a circumferential direction by a rotational motion of a rotating plate such that a clamping-associated device is simply configured, the inertia of the clamping tooth is not large, a high-speed operation is easily performed and a process of processing a column is simplified.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Exemplary embodiments of the present invention will now be described in greater detail with reference to the accompanying drawings.

Figure 1:
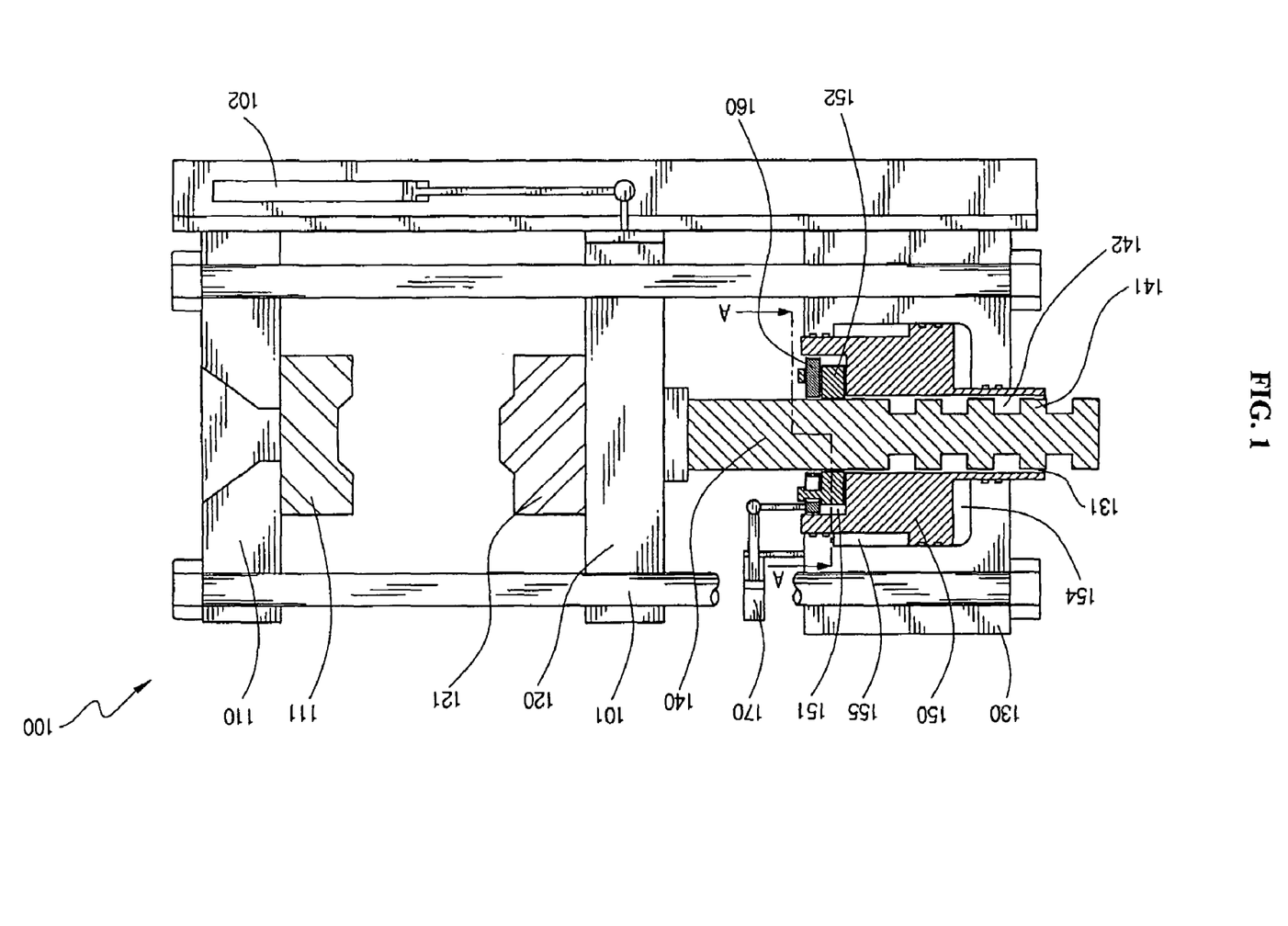
FIG. 1 is a front cross-sectional view of a mold clamping unit according to an embodiment of the present invention.

FIG. 1 is a front cross-sectional view of a mold clamping unit according to an embodiment of the present invention. Referring to FIG. 1, a molding clamping unit 100 includes a first fixed platen 110, a moving platen 120, and a second stationary platen 130.

The first fixed platen 110, the moving platen 120, and the second fixed platen 130 are sequentially arranged and are connected by a tie bar 101 in a single unit. A first mold 111 and a second mold 121 are provided on opposed surfaces of the first fixed platen 110 and the moving platen 120, respectively. For example, the convex-shaped first mold 111 may be provided on the first fixed platen 110 and the concave-shaped second mold 121 may be provided on the moving platen 120 that is opposite to the first fixed platen 110.

The moving platen 120 moves between the first fixed platen 110 and the second fixed platen 130 along the tie bar 101. As such, mold clamping between the second mold 121 of the moving platen 120 and the first mold 111 of the first fixed platen 110 is determined. Here, moving of the moving platen 120 can be performed by a template transfer cylinder 102 provided at one side of the moving platen 120 and the first fixed platen 110 or machine frame respectively.

A rod-shaped column 140 is provided at one side of the moving platen 120, specifically, on the moving platen 120 that is opposite to a surface of the second mold 121. A cross section of the column 140 may be circular, for example.

A plurality of column teeth 141 having predetermined width and height are provided on the surface of the column 140 along an axial direction of the column 140 at regular intervals. A column groove 142 having a predetermined width is provided between the column teeth 141. Here, the width of the column teeth 141 and the width of the column groove 142 may not have the same size.

As described above, the second fixed platen 130 is basically connected to the first fixed platen 110 and the tie bar 101 and stably guides moving between the first fixed platen 110 of the moving platen 120 and the second fixed platen 130.

A mold clamping piston 150 is provided in an inner center of the second fixed platen 130. A central portion of the mold clamping piston 150 is opened so that the column 140 can penetrate the mold clamping piston 150. Here, a cross-sectional shape of a center bore 131 of the mold clamping piston 150 may correspond to a cross-sectional shape of the column 140.

Figure 2:
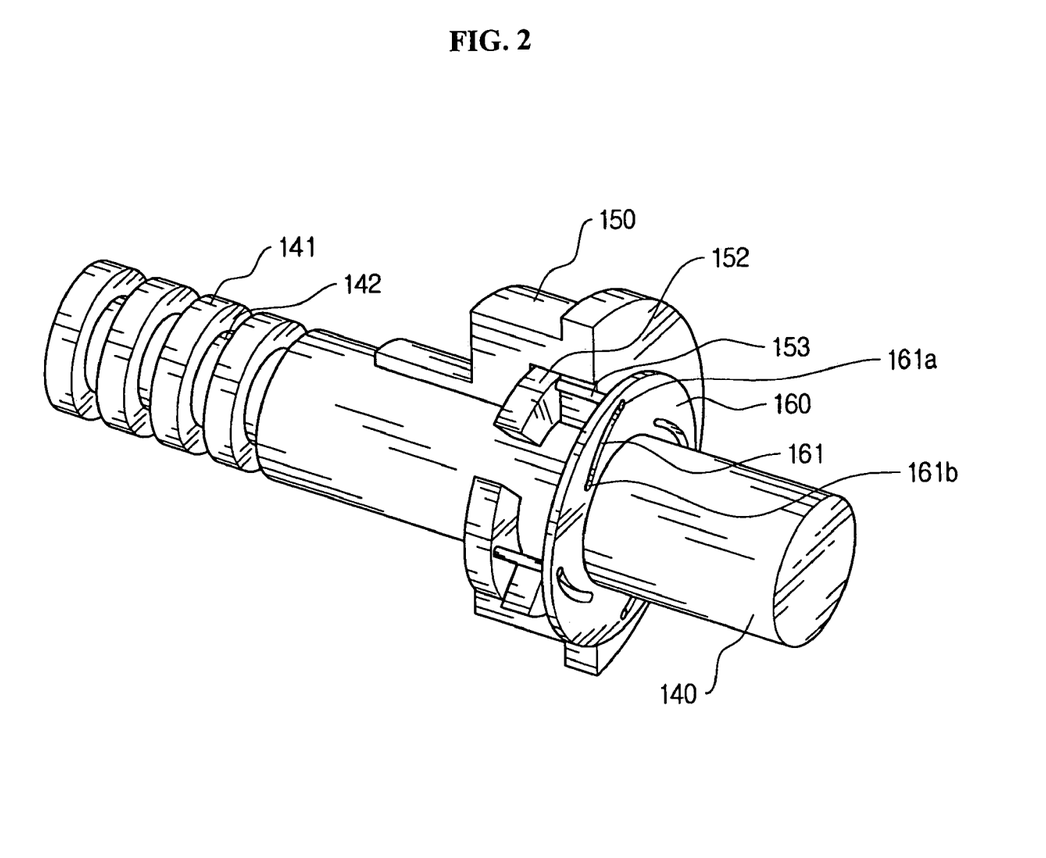
FIG. 2 is a perspective view of a column and a mold clamping piston of the mold clamping unit illustrated in FIG. 1.

FIG. 2 is a perspective view of a column and a mold clamping piston of the mold clamping unit illustrated in FIG. 1. Referring to FIG. 2, a clamping tooth seating groove 151 in which a clamping tooth 152 is seated is provided in a predetermined inner portion of the mold clamping piston 150. The clamping tooth seating groove 151 contacts the center bore 131 of the mold clamping piston 150 and may be formed in a ring shape along the center bore 131. The clamping tooth 152 is seated in the clamping tooth seating groove 151. A plurality of clamping teeth 152 may be provided in an axial direction of the column 140. Here, the width of the clamping tooth 152 may have the size corresponding to the width of the claming groove 142 placed between the column teeth 141.

Figure 3:
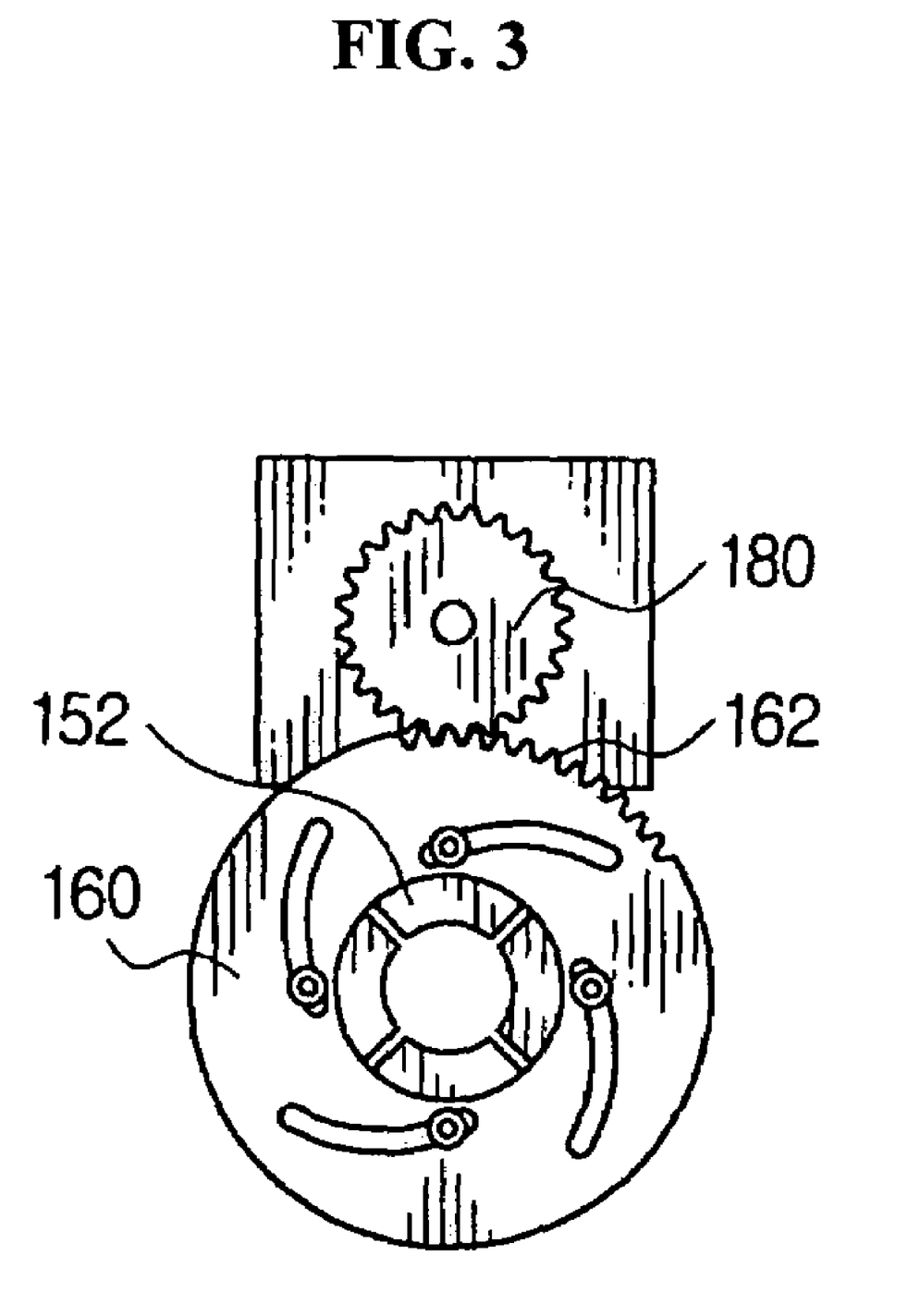
FIG. 3 is a front cross-sectional view of a rotating means of a rotating plate according to another embodiment of the present invention.

A rotating plate 160 is provided in a position that is separated from the clamping tooth 152 in an axial direction of the column 140 by a predetermined distance. The rotating plate 160 can be rotated by a predetermined driving means. Specifically, the rotating plate 160 can be rotated by connecting a hydraulic piston 170 to one side of the rotating plate 160, as illustrated in FIG. 1. Alternatively, the rotating plate 160 can be rotated by a predetermined driving motor (not shown) when a fine gear 162 is formed around the rotating plate 160 and a pinion 180 is provided to be engaged with the fine gear 162, as illustrated in FIG. 3.

Referring to FIG. 2, a clamping tooth guide groove 161 having a predetermined length is formed on the rotating plate 160. A teeth rod 153 is positioned in the clamping tooth guide groove 161 so that the teeth rod 153 can move in the space of the clamping tooth guide groove 161. A moving operation of the teeth rod 153 will be described later.

The teeth rod 153 is fixed and supported at one side of each clamping tooth 152. That is, the number of the teeth rod 153 corresponds to the number of the clamping teeth 152. In addition, the clamping tooth guide groove 161 in which one end of each teeth rod 153 is positioned and which has the number corresponding to the number of the clamping teeth 152 is also provided on the rotating plate 160. As each clamping tooth guide groove 161 provided on the rotating plate 160 has a predetermined length, each clamping tooth guide groove 161 includes a groove starting point 161a and a groove ending point 161b. The groove ending point 161b is relatively close to the center of the rotating plate 160 compared to the groove starting point 161a. In addition, each clamping tooth guide groove 161 may have a predetermined curvature.

The rotating plate 160 can be rotated by a predetermined driving means, as described above. By rotation of the rotating plate 160, each teeth rod 153 can move in the clamping tooth guide groove 161, that is, between the groove starting point 161a and the groove ending point 161b. In addition, as each teeth rod 153 is connected to each of the clamping tooth 152 and is fixed therein, the clamping tooth 152 also move when each teeth rod 153 moves.

At this time, as the clamping tooth guide groove 161 is formed so that its groove starting point 161a and its groove ending point 161b are not positioned at the same distance from the center of the rotating plate 160, when the teeth rod 153 moves in the clamping tooth guide groove 161, the clamping tooth 152 moves in a direction that is close to or distant from the rotating plate 160. Specifically, when the teeth rod 153 moves to the groove ending point 161b from the groove starting point 161a, the clamping tooth 152 moves in a direction that is close to the center of the rotating plate 160 when its motion in a circumferential direction is confined by the clamping tooth seating groove 151 in the mold clamping piston 150. On the other hand, when the teeth rod 153 moves to the groove starting point 161a from the groove ending point 160, the clamping tooth 152 moves in a direction that is distant from the center of the rotating plate 160. Here, when the clamping tooth 152 moves in the direction that is close to the center of the rotating plate 160, the clamping tooth 152 is inserted into the column groove 142 of the column 140 so that the column 140 and the mold clamping piston 150 can be engaged.

As the teeth rod 153 moves by rotation of the rotating plate 160, a space in which the teeth rod 153 can move should be provided inside the mold clamping piston 150. For reference, the rotating plate 160 may be provided inside or outside the mold clamping piston 150. When the rotating plate 160 is provided inside the mold clamping piston 150, a space (not shown) corresponding to the rotating plate 160 is provided inside the mold clamping piston 150.

Figure 10:
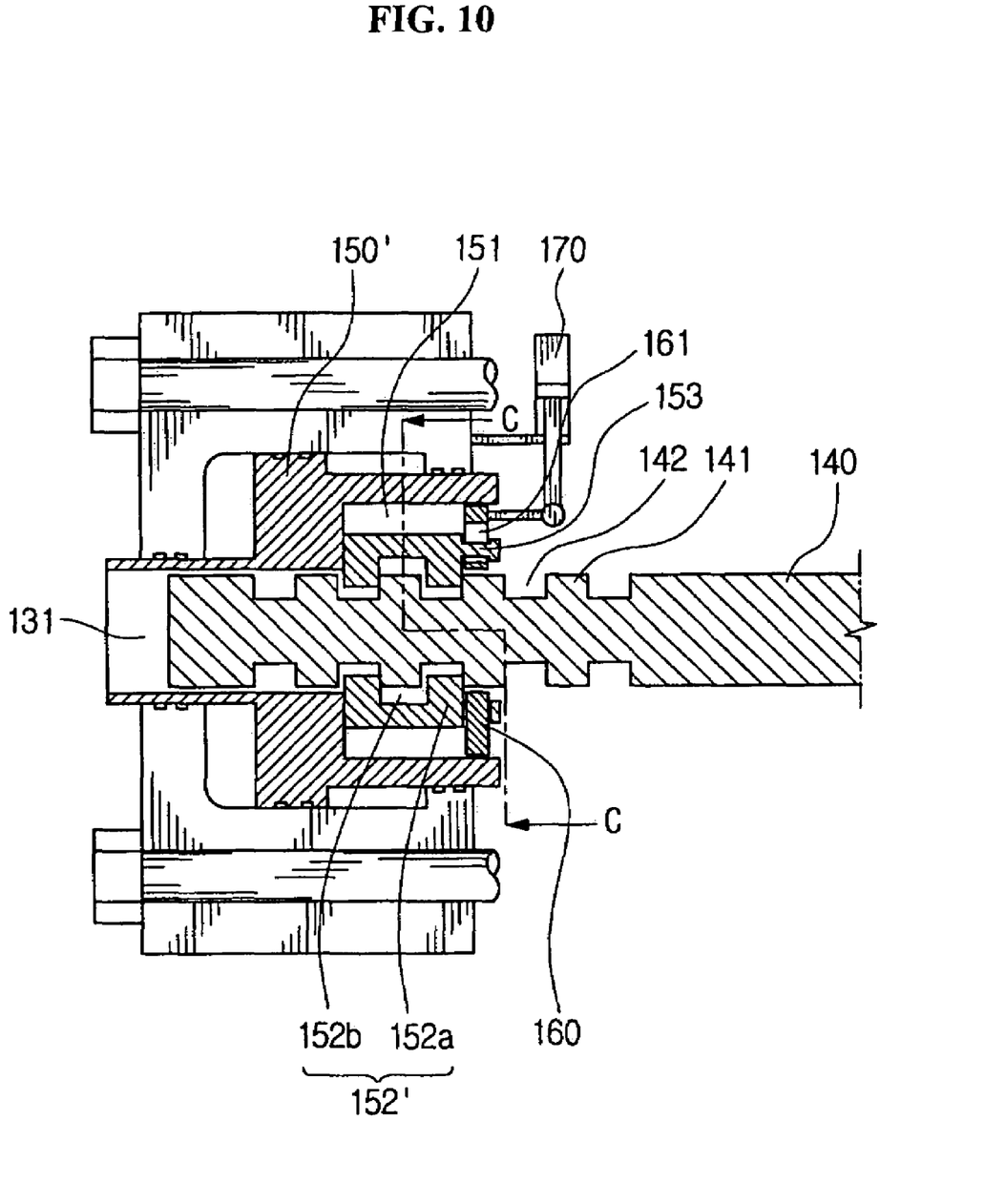
FIG. 10 is a front cross-sectional view of clamping teeth according to another embodiment of the present invention.
Figure 11:
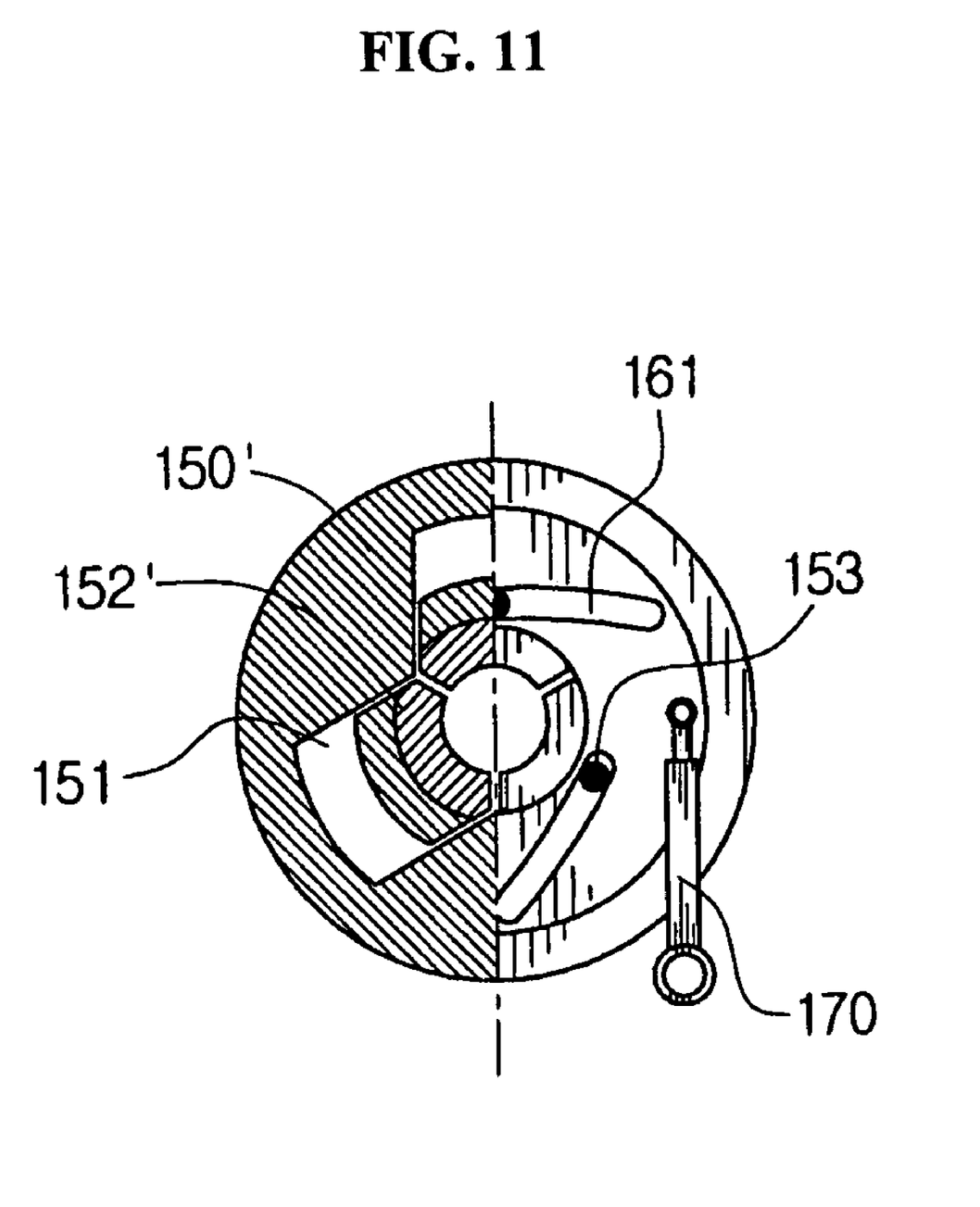
FIG. 11 is a cross-sectional view taken along line C-C' of FIG. 10.

The clamping tooth 152 can be modified and implemented in various shapes. According to an embodiment of the present invention, as illustrated in FIGS. 10 and 11, a clamping tooth 152' may be implemented so that a plurality of clamping tooth protrusions 152a can be provided in an axial direction of the column 140. Here, FIG. 11 is a cross-sectional view taken along line C-C of FIG. 10. As illustrated in FIG. 11, a plurality of clamping teeth 152' can be installed in a circumferential direction. For reference, a space between the clamping tooth protrusions 152a can be defined as a column tooth groove 152b.

The clamping tooth 152' in which the column tooth 141 of the column 140 can be accommodated can be provided. When the column tooth groove 152b is provided, the clamping tooth 152' includes at least one column tooth groove 152b and at least one clamping tooth protrusion 152a and has an uneven shape. Here, the width of the column tooth groove 152b and the width of the clamping tooth protrusion 152b correspond to the width of the column tooth 141 and the width of the column groove 142, respectively.

Referring to FIG. 1, a first oil chamber 154 and a second oil chamber 155 are provided at one side of the mold clamping piston 150. The first oil chamber 154 is a space to which a high-pressure operating oil is supplied. If the operating oil is supplied to the first oil chamber 154, the mold clamping piston 150 and the column 140 can be securely clamped by the pressure of the operating oil. On the other hand, the second oil chamber 155 is a space to which operating oil is supplied. If the operating oil is supplied to the second oil chamber 155, a rear motion of the mold clamping piston 150 is possible.

Figure 4:
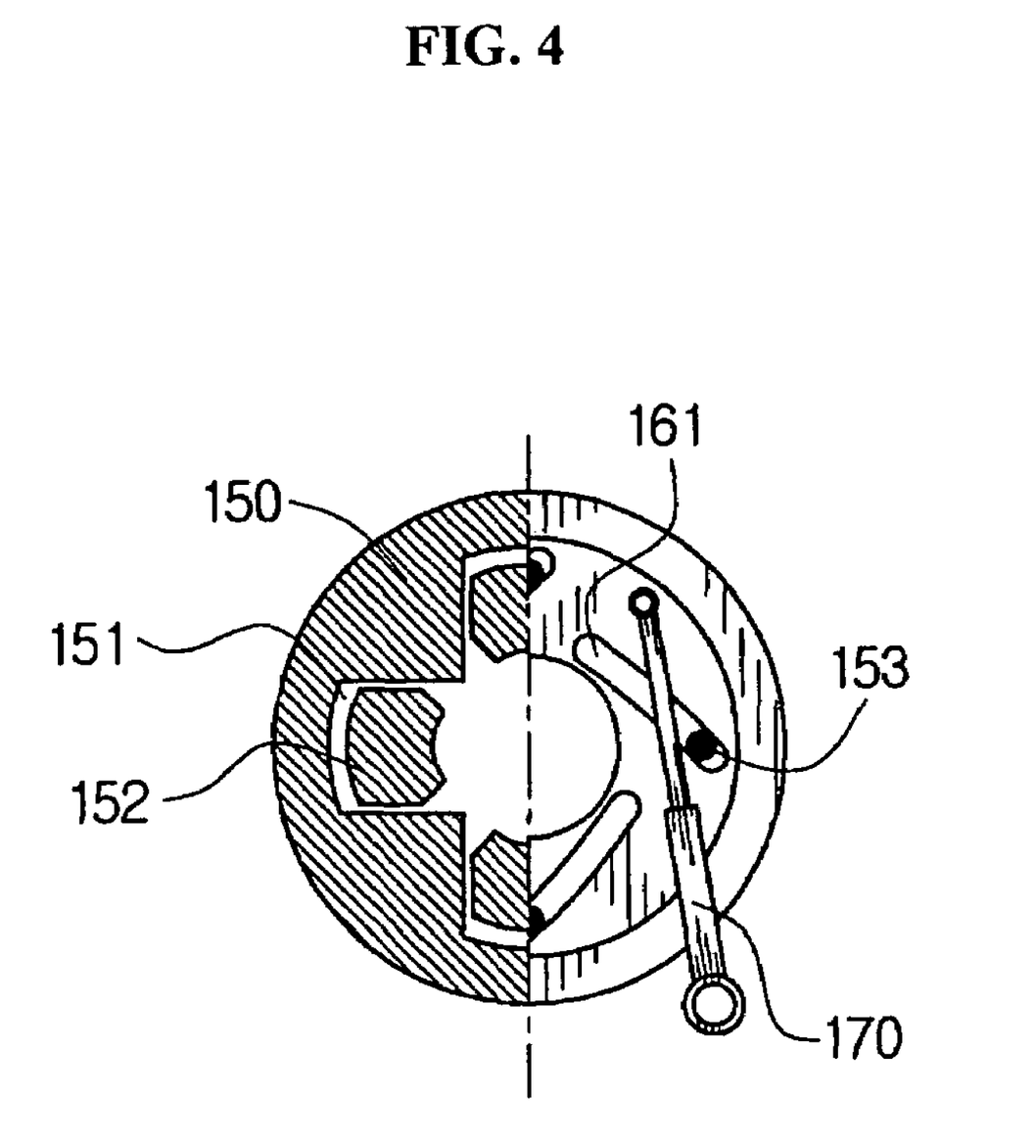
FIG. 4 is a cross-sectional view taken along line A-A' of FIG. 1.
Figure 5:
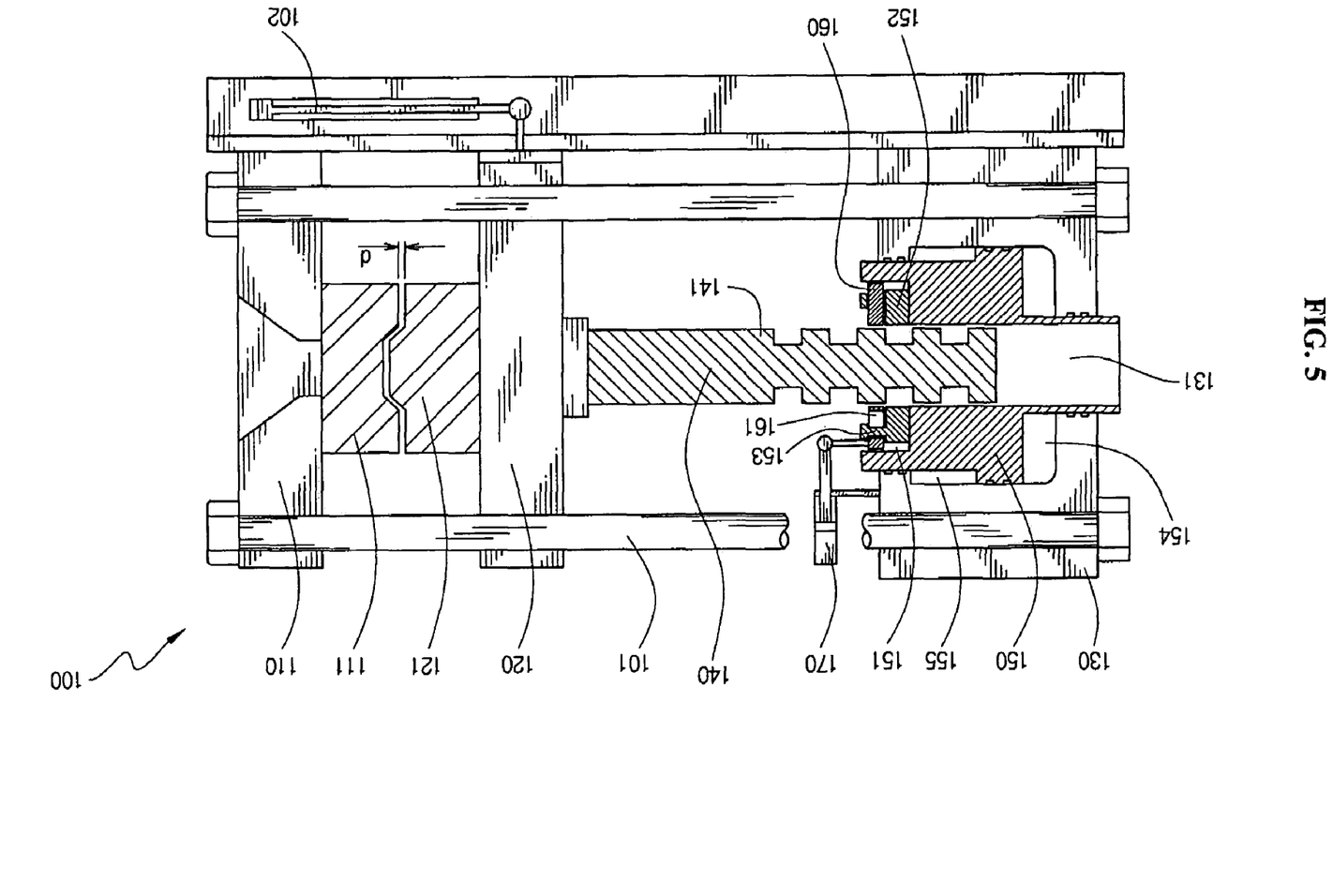
FIG. 5 is a front cross-sectional view showing the state where the column and a moving platen of the mold clamping unit illustrated in FIG. 1 move.
Figure 6:
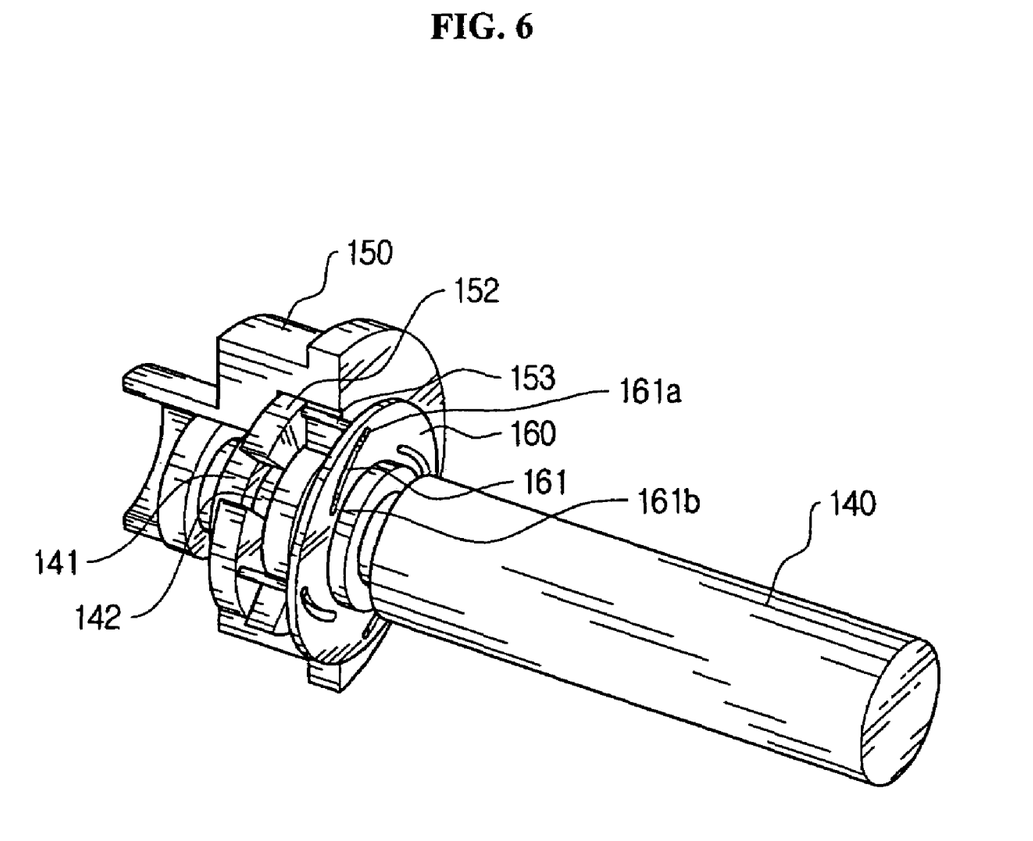
FIG. 6 is a perspective view of the column and the mold clamping piston in the state of FIG. 5.
Figure 7:
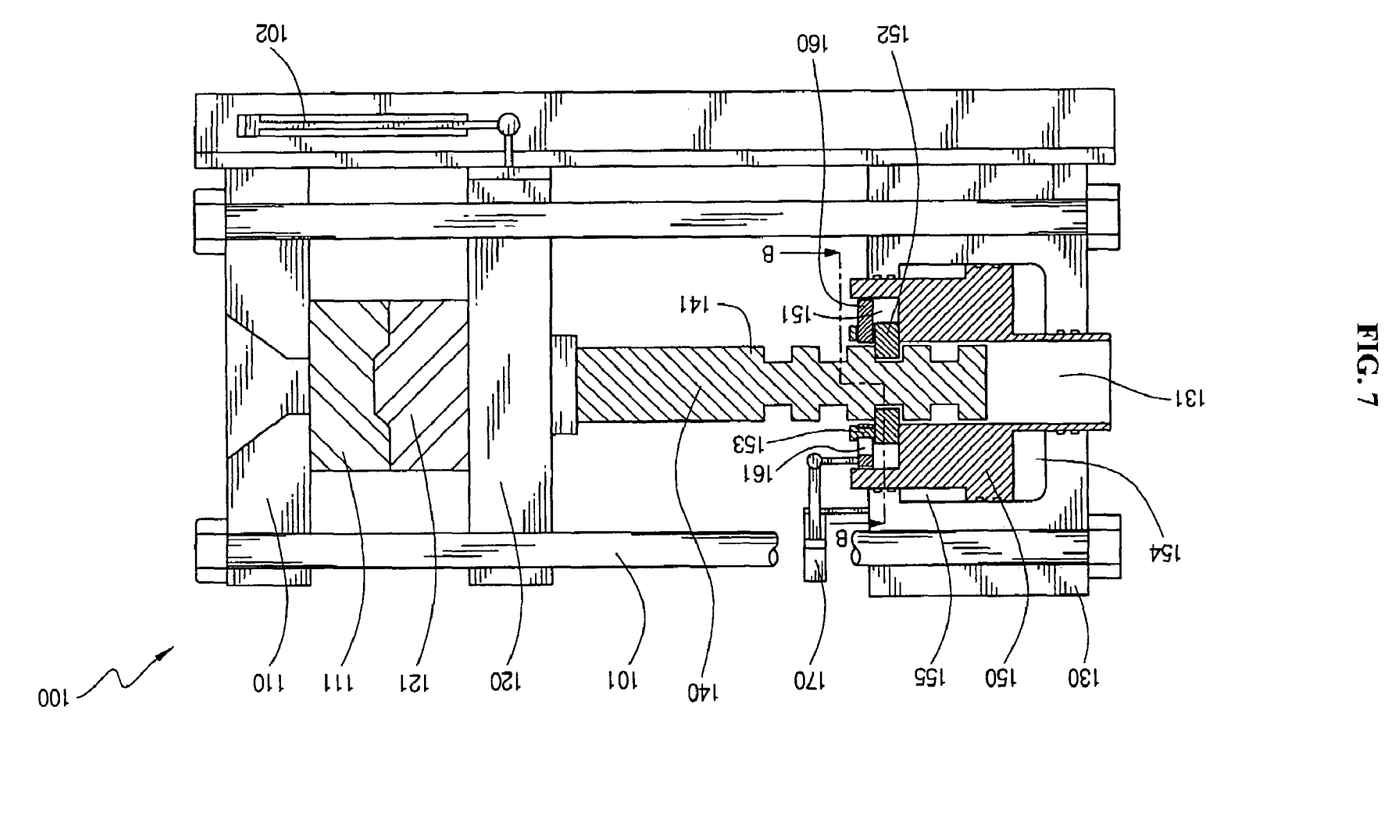
FIG. 7 is a front cross-sectional view showing the case where the mold clamping piston and the column are engaged with each other by clamping teeth in the state of FIG. 5.
Figure 8:
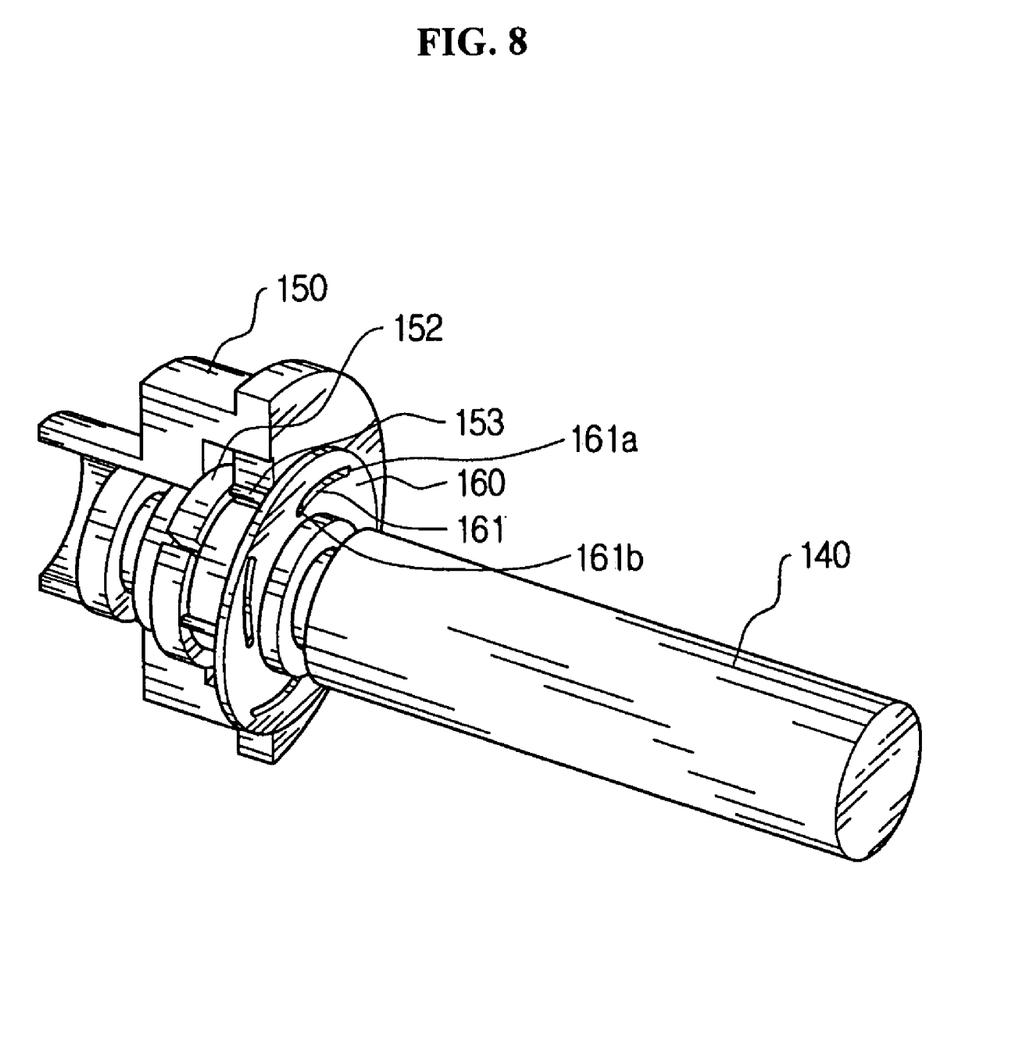
FIG. 8 is a perspective view of the column and the mold clamping piston in the state of FIG. 5.
Figure 9:
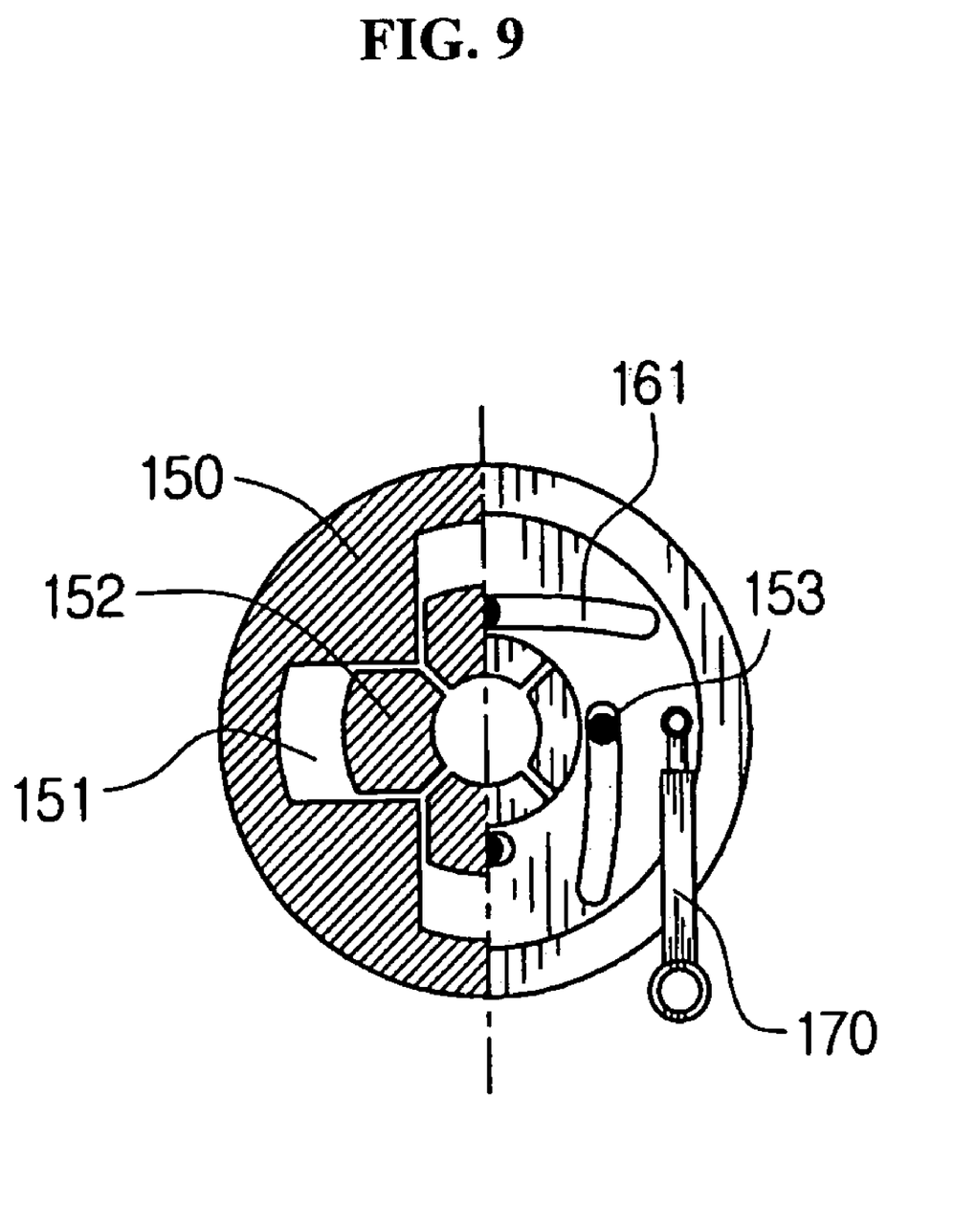
FIG. 9 is a cross-sectional view taken along line B-B' of FIG. 7.

An operation of the mold clamping unit having the above structure according to the present invention will now be described. FIGS. 1, 5, and 7 illustrate a procedure in which the column 140 and the moving platen 120 move according to the operation of the mold clamping unit according to the present invention. FIGS. 2, 6, and 8 are reference diagrams illustrating a procedure in which a column and a mold clamping piston are engaged, illustrated in FIGS. 1, 5, and 7, respectively. FIGS. 4 and 9 are cross-sectional views taken along line A-A' of FIG. 1 and B-B' of FIG. 7, respectively.

The operation of the mold clamping unit according to the present invention is largely classified into a mold opening operation in which mold clamping is released, and a mold closing operation in which a mold is clamped. First, the mold opening operation is a state in which mold clamping is released, as described above. As illustrated in FIG. 1, the first mold 111 of the first fixed platen 110 and the second mold 121 of the moving platen 120 are separated from each other. In addition, the moving platen 120 is relatively close to the second fixed platen 130 and a portion of the column 140 provided on the moving platen 120 penetrates the center bore 131 of the second fixed platen 130 and is protruded. A correlation between the column 140 and the mold clamping piston 150 is illustrated in FIGS. 2 and 4.

The mold closing operation is performed in the mold opening state. The mold closing operation can be classified into a high-speed moving operation, a locking operation, and a clamping operation.

First, the high-speed moving operation is a procedure in which the moving platen 120 moves to the first fixed platen 110 along the tie bar 101 by the template transfer cylinder 102 provided at one side of the moving platen 120 and the first fixed platen 110 or machine frame, respectively, in the mold opening state. Through the high-speed transfer operation, the second mold 121 of the moving platen 120 and the first mold 111 of the first fixed platen 110 are close to each other or do not contact each other, as illustrated in FIG. 5. That is, in order to prevent mold damages caused by rapid mold clamping, the second mold 121 of the moving platen 120 and the first mold 111 of the first fixed platen 110 are separated from each other at a predetermined small distance d. At this time, as the high-speed transfer operation is performed, the column 140 also moves toward the first fixed platen 110 together with the moving platen 120 so that the column tooth 141 of the column 140 can be positioned in the center bore 131 of the mold clamping piston 150.

When the high-speed moving operation is completed, as illustrated in FIG. 6, the clamping tooth 152 is positioned in the clamping tooth seating groove 151 of the mold clamping piston 150. In addition, the teeth rod 153 connected to the clamping tooth 152 is positioned in the groove starting point 161a of the clamping tooth guide groove 161.

The locking operation proceeds when the high-speed moving operation is completed. The locking operation is a procedure in which the column 140 and the mold clamping piston 150 are engaged. To this end, first, the rotating plate 160 is rotated using a predetermined driving means. Specifically, the hydraulic piston 170 is connected to one side of the rotating plate 160 so that the rotating plate 160 can be rotated (see FIG. 1). Alternatively, the rotating plate 160 can be rotated by a predetermined driving motor in the state where the fine gear 162 is formed around the rotating plate 160 and the pinion 180 is provided to be engaged with the fine gear 162 (see FIG. 3).

By rotation of the rotating plate 160, each teeth rod 153 moves toward the groove ending point 161b from the groove starting point 161a of the clamping tooth guide groove 161, as illustrated in FIGS. 7, 8, and 9. At this time, as described above, the groove ending point 161b of the clamping tooth guide groove 161 is relatively close to the center of the rotating plate 160 compared to the groove starting point 161a. Thus, the teeth rod 153 moves toward the center from an outer wall of the rotating plate 160. As such, each clamping tooth 152 connected to each teeth rod 153 moves toward the center of the column 140 and is finally seated in the column groove 142 of the column 140.

Since the clamping tooth 152 is seated in the column groove 142 of the column 140, an operation of locking the column 140 and the mold clamping piston 150 is completed. For reference, when the clamping tooth 152 includes at least one column tooth groove 152b and at least one clamping tooth protrusion 152a, by rotation of the rotating plate 160, each clamping tooth 152 connected to each teeth rod 153 moves toward the center of the column 140. Finally, the clamping tooth protrusion 152a is seated in the column groove 142 of the column 140 and the column tooth 141 of the column 140 is seated in the column tooth groove 152b so that the column 140 and the mold clamping piston 150 can be locked.

When the locking operation, that is, engaging the column 140 with the clamping piston 150, is completed, the boosting operation is performed. First, if a high-pressure operating oil is supplied to the first oil chamber provided at one side of the mold clamping piston 150, clamping force caused by an oil pressure of the operating oil is applied to the mold clamping piston 150. At this time, since the mold clamping piston 150 and the column 140 are engaged, the force applied to the mold clamping piston 150 is also transferred to the column 140.

In addition, since the column 140 is connected to the moving platen 120, the load caused by the operating oil is finally transferred to the second mold 121 of the moving platen 120. As such, the first mold 111 of the first fixed platen 110 and the second mold 121 of the moving platen 120 are clamped. For reference, since the high-pressure operating oil flows into the first oil chamber 154, the column 140 and the moving platen 120 can move in a forward direction at a small distance.

By the above-described operations, that is, the high-speed moving operation, the locking operation and the clamping opreation the mold closing operation is completed. Meanwhile, the mold opening operation after the mold closing operation proceeds in a reverse order of the mold closing operation. Specifically, after the operating oil of the first oil chamber 154 is discharged, the rotating plate 160 is rotated so that the engaging state between the clamping tooth 152 and the column 140 can be released, and subsequently, the operating oil is supplied to the second oil chamber 155 so that the mold clamping piston 150 can move in a backward direction. At this time, when clamping between the clamping tooth 152 and the column 140 is released, the teeth rod 153 moves to the groove starting point 153 to the groove ending point 161b of the clamping tooth guide groove 161. As such, the clamping tooth 152 moves to the clamping tooth seating groove 151 of the mold clamping piston 150.

The mold clamping unit according to the present invention is applied to an injection molding apparatus but the present invention is not limited thereto. The mold clamping unit can also be applied to all industrial devices requiring mold clamping.

The mold clamping unit according to the present invention has the following effects. First, since a plurality of clamping teeth are engaged in a column by a rotational motion of a rotating plate such that a clamping-associated device can be simply configured and the inertia of the clamping tooth is not large, a high-speed operation can be easily performed and a process of processing a column can be simplified. In addition, as the clamping operation is performed using a small amount of operating oil, an energy efficiency is high and the size of an oil chamber storing an operating oil and the size a mold clamping piston are reduced such that an area for installing the device is reduced.

Furthermore, as a high-speed moving operation and the clamping operation are separately performed, a moving speed for mold opening and closing is fast and a uniform mold clamping force can be applied to the entire surface of the mold such that work reliability is improved.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A mold clamping unit comprising:
   a column mounted in a transfer means and moving in forward and backward directions;
   a mold clamping piston in which a locking operation with the column;
   a plurality of column teeth disposed on a surface of the column along an axial direction of the column, a space between the column teeth being defined as a column groove by the column teeth;
   a center bore provided in a central portion of the mold clamping piston so that the column can penetrate and can move through the center bore when the column moves in forward and backward directions;
   a clamping tooth seating groove provided inside the mold clamping piston contacting the center bore along a circumference of the center bore;
   a plurality of clamping teeth seated in the clamping tooth seating groove in a circumferential direction;
   a rotating plate in one side of the clamping teeth;
   a plurality of clamping tooth guide grooves having a predetermined length provided on the rotating plate toward a center from an outer wall of the rotating plate; and
   a teeth rod positioned in each of the clamping tooth guide groove,
   wherein each teeth rod is connected to each clamping teeth so that, when the rotating plate makes a rotational motion, each teeth rod can move in the clamping teeth guide groove, each clamping tooth can move in a central or radial direction of the rotating plate and clamping of the clamping tooth and the column can proceed.

2. The mold clamping unit of claim 1, wherein each clamping tooth guide groove includes a groove starting point and a groove ending point and the groove ending point is relatively close to a center of the rotating plate compared to the groove starting point.

3. The mold clamping unit of claim 2, wherein each clamping tooth guide groove has a predetermined curvature.

4. The mold clamping unit of claim 1, wherein the clamping tooth includes at least one clamping tooth protrusion in the axial direction of the column.

5. The mold clamping unit of claim 4, wherein a width of the column tooth groove and a width of the clamping tooth protrusion correspond to a width of the column tooth of the column and a width of the column groove, respectively.

6. The mold clamping unit of claim 1, wherein a hydraulic piston is provided at one side of the rotating plate so that rotation of the rotating plate can be rotated by operating the hydraulic piston.

7. The mold clamping unit of claim 1, wherein a fine gear is formed in the rotating plate, a pinion is provided at one side of the rotation plate to be engaged with the fine gear and a driving motor for transmitting a driving force to the pinion is provided so that the rotation plate can be rotated by driving the driving motor.

8. A mold clamping unit comprising:
   a first fixed platen and a second fixed platen separated from each other and disposed in parallel to each other;
   a moving platen making a reciprocal motion and moving in a space between the first fixed platen and the second fixed platen;
   a tie bar connecting the moving platen to the first and second fixed platens in a single unit and guiding moving of the moving platen;
   a column whose one end is connected to the moving platen and in which column teeth having an uneven shape on a surface of the column along an axial direction and column grooves are sequentially arranged;
   a mold clamping position in which a center bore is formed so that the column can penetrate the center bore and can move thereto and which transmits a mold clamping force to the column;
   a plurality of clamping teeth which is provided in a position that is separated from each other in a circumferential direction of the column and which can be selectively attached or detached to or from the column groove of the column;
   a rotating plate provided in a position that is separated from the clamping tooth in an axial direction of the column; and
   a teeth rod whose one end is connected to the clamping tooth and whose the other end is connected to the rotating plate, so as to transmit a rotation driving force of the rotating plate to each clamping teeth.

9. The mold clamping unit of claim 8, wherein a clamping tooth seating groove is provided inside the mold clamping position contacting the center bore in a ring shape along a circumference of the center bore so that a plurality of clamping teeth can be seated in the clamping tooth seating groove in a circumferential direction and the clamping tooth can move along the clamping tooth seating groove.

10. The mold clamping unit of claim 8, wherein a plurality of clamping tooth guide grooves from an outer wall to a center of the rotating plate are provided on the rotating plate and the teeth rod moves in each clamping tooth guide groove.

11. The mold clamping unit of claim 10, wherein each clamping tooth guide groove includes a groove starting point and a groove ending point and the groove ending point is relatively close to a center of the rotating plate compared to the groove starting point.

12. The mold clamping unit of claim 10, wherein each clamping tooth guide groove has a predetermined curvature.

13. The mold clamping unit of claim 8, wherein a hydraulic position is provided at one side of the rotating plate so that the rotating plate can be rotated by operating the hydraulic piston.

14. The mold clamping unit of claim 8, wherein a fine gear is formed in the rotating plate, a pinion is provided at one side of the rotation plate to be engaged with the fine gear and a driving motor for transmitting a driving force to the pinion is provided so that the rotation plate can be rotated by driving the driving motor.

15. The mold clamping unit of claim 8, wherein the clamping tooth includes at least one clamping tooth protrusion in an axial direction of the column.

* * * * *